(12) United States Patent
Wu et al.

(10) Patent No.: US 7,835,610 B2
(45) Date of Patent: Nov. 16, 2010

(54) OPTICAL WAVEGUIDE

(75) Inventors: Wei Wu, Palo Alto, CA (US);
Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 60 days.

(21) Appl. No.: 11/786,519

(22) Filed: Apr. 11, 2007

(65) Prior Publication Data

US 2008/0253727 A1    Oct. 16, 2008

(51) Int. Cl.
    *G02B 6/10*    (2006.01)
(52) U.S. Cl. .................. 385/131; 385/129; 385/130; 385/132; 264/1.24
(58) Field of Classification Search ......... 385/129–132; 264/1.24; 65/386
    See application file for complete search history.

(56) References Cited

U.S. PATENT DOCUMENTS

| | | | |
|---|---|---|---|
| 5,155,792 A | 10/1992 | Vali et al. | |
| 5,802,236 A | 9/1998 | DiGiovanni et al. | |
| 6,301,420 B1 | 10/2001 | Greenaway et al. | |
| 6,738,550 B2 | 5/2004 | Town | |
| 2004/0136671 A1* | 7/2004 | Nakahara | 385/125 |
| 2006/0263024 A1 | 11/2006 | Dong et al. | |
| 2007/0104431 A1* | 5/2007 | Di Teodoro et al. | 385/123 |

OTHER PUBLICATIONS

K.P. Hansen, "Dispersion flattened hybrid-core nonlinear photonic crystal fiber," Optics Express, Jun. 30, 2003, pp. 1503-1509, vol. 11, No. 13, Optical Society of America.*

* cited by examiner

*Primary Examiner*—Mark A Robinson
*Assistant Examiner*—Michael P Mooney

(57) ABSTRACT

An optical waveguide and method of making are disclosed. The method of making includes forming a layer on a substrate of a substantially optically transparent material. The layer includes an inner area and an outer area. A sufficient number of voids can be created in the inner area to form a first index of refraction. A plurality of the voids have a dimension that is less than a wavelength of the light beam. A sufficient number of voids can be created in the outer area to form a second index of refraction less than the first index.

22 Claims, 3 Drawing Sheets

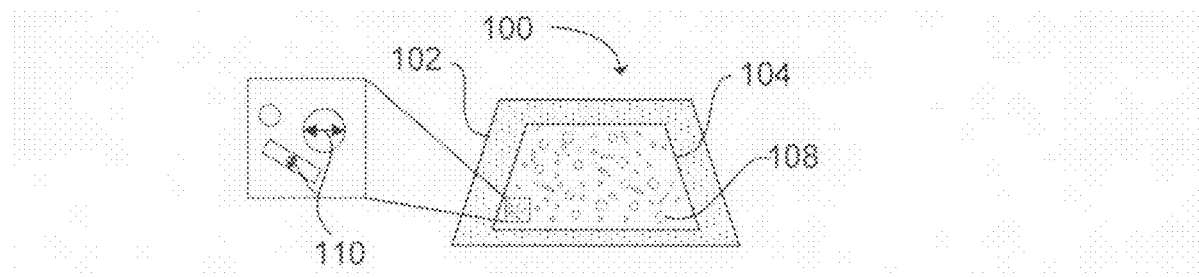
FIG. 1a
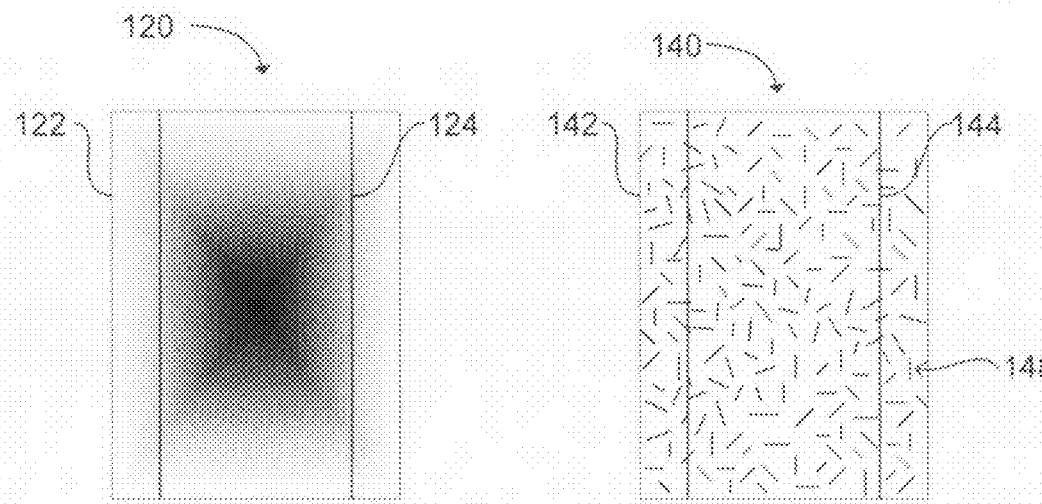
FIG. 1b
FIG. 1c
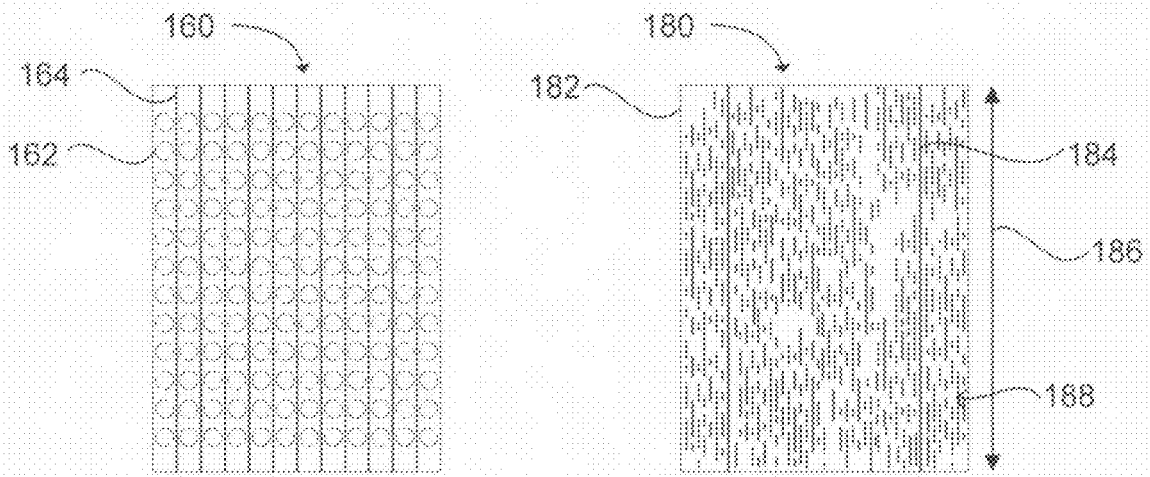
FIG. 1d
FIG. 1e

OPTICAL WAVEGUIDE

BACKGROUND

Fiber optics have revolutionized the ability to transmit broadband data over long distances. However, less than fifty years ago, most scientists and engineers felt that fiber optics were too lossy to be effectively used for long distance communication. Early fibers had a loss on the order of 1 dB per meter, rendering any signal sent over a long distance too weak to recover. It wasn't until methods were found to remove impurities in glass that fiber optics became feasible for broadband communications.

As computer chip speeds on circuit boards increase to ever faster speeds, a communications bottleneck in inter-chip communication is becoming a larger problem. One likely solution is to use fiber optics to interconnect high speed computer chips. However, most circuit boards involve many layers and often require tolerances in their manufacture of less than a micron. Physically placing fiber optics and connecting the fibers to the chips can be too inaccurate and time consuming to be widely adopted in circuit board manufacturing processes. Optical interconnects between chips have therefore proven illusive, despite the need for broadband data transfer.

BRIEF DESCRIPTION OF THE DRAWINGS

FIG. 1a is an illustration of a front view of an optical waveguide having an inner area and an outer area with a plurality of voids in accordance with an embodiment of the present invention;

FIG. 1b is an illustration of a top view of an optical waveguide having an inner area and an outer area, with a gradient of voids with the inner area having a lower density of voids and the outer area having a higher density of voids in accordance with an embodiment of the present invention;

FIG. 1c is an illustration of a top view of an optical waveguide having an inner area and an outer area with a plurality of voids in accordance with an embodiment of the present invention;

FIG. 1d is an illustration of a top view of an optical waveguide having an inner area and an outer area with a plurality of regularly spaced holes and channels in accordance with an embodiment of the present invention;

FIG. 1e is an illustration of a top view of an optical waveguide having an inner area and an outer area with a plurality of collinear voids in accordance with an embodiment of the present invention;

DETAILED DESCRIPTION OF EXAMPLE EMBODIMENTS

Figure 2A:
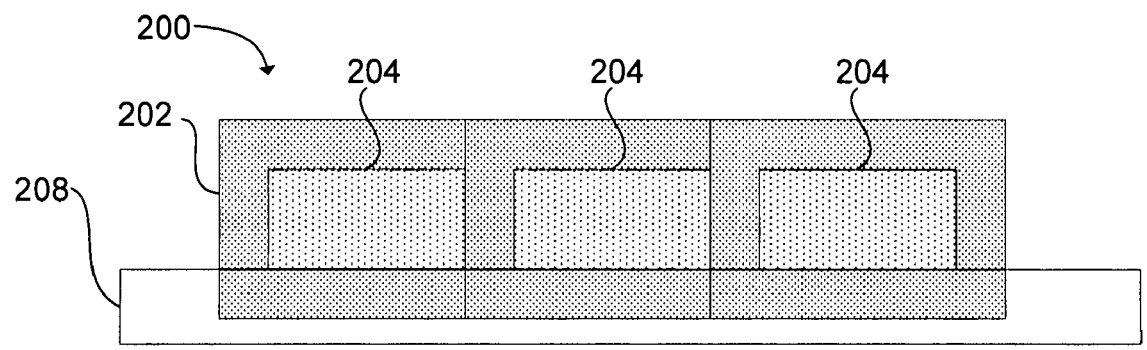
FIG. 2a is an illustration of a front view of a one dimensional array of optical waveguides formed on a substrate in accordance with an embodiment of the present invention.

Reference will now be made to the exemplary embodiments illustrated, and specific language will be used herein to describe the same. It will nevertheless be understood that no limitation of the scope of the invention is thereby intended.

One method for forming optical interconnects between computer chips on a circuit board is to use optical waveguides formed on the circuit board. Optical waveguides can be superior to fiber optic communications because of the ability to form the waveguides on the circuit board using lithographic or similar processes. The waveguides are typically formed on the circuit boards with substantially optically transparent material, such as polymers and/or dielectrics. Optical waveguides made using lithographic or similar processes can also be formed on other types of substrates that are not mounted on a circuit board. For example, optical waveguide (s) may be formed on a flexible substrate to create a ribbon cable having one or more optical waveguides. The optical waveguides disclosed in this application are formed on substrates using lithographic or similar processes.

Forming optical waveguides in this fashion can provide interconnects that are constructed with the necessary physical tolerances to be used on modern multi-layer circuit boards. However, the polymers, dielectrics, and other materials that can be used in chip and circuit board manufacture to form the on-board waveguides are typically significantly more lossy than fiber optics. Indeed, the amount of loss in on-board waveguides has been one of the factors limiting the acceptance of optical waveguide interconnects. Polymers used to construct the waveguides can have a loss of 0.1 dB per centimeter. In contrast, the loss in a fiber optic is around 0.1 dB per kilometer. Thus, polymer waveguides can have losses that are orders of magnitude greater than the loss in fiber optics.

The high loss in optical waveguides can limit the distance that information can be transmitted across a circuit board. Optical waveguides having a length of one meter or more may be used on large circuit boards. However, with a loss of 0.1 dB per centimeter, or 10 dB per meter, it is not practical to transmit data at a sufficient power for the data to be received at a distance of one meter. Together with coupling loss of laser to fiber and fiber to detector, the total loss can be 12 dB, which may be excessive. A total loss of 3-4 dB can be preferable. In accordance with one aspect of the invention, it has been recognized that a photonic guiding device is needed that significantly reduces the amount of loss in an optical waveguide.

The ability of an optical waveguide to direct light is largely dependent on the refractive index of the material(s) used in forming the waveguide. The refractive index or index of refraction of a medium is the inverse ratio of the phase velocity of a wave, such as light, and the phase velocity in a reference medium. For light, the index of refraction, typically given the symbol n, is equal to:

$$n = \sqrt{\epsilon_r \mu_r}$$

where $\epsilon_r$ is the material's relative permittivity and $\mu_r$ is the material's relative permeability. For free space, the value of n is 1.0. For most types of materials, the value of n is greater than one.

When light crosses a boundary between materials with different refractive indices, the light beam will be partially refracted at the boundary surface, and partially reflected. The angle of incidence where light is refracted so that it travels along the boundary is referred to as the critical angle. If the angle of incidence is greater (i.e.: the ray is closer to being parallel to the boundary) than the critical angle then the light will stop crossing the boundary altogether and instead totally reflect back internally. This occurs where light travels from a medium with a higher refractive index to one with a lower refractive index. For example, it will occur when passing from glass to air, but not when passing from air to glass.

Waveguides and optical fibers can be used to direct light using an optical phenomenon called total internal reflection. Total internal reflection occurs when light strikes a medium boundary at a steep angle. If the refractive index is lower on the other side of the boundary then no light can pass through, so effectively all of the light is reflected. The critical angle is the angle of incidence above which the total internal reflection occurs.

Using the principles of total internal reflection or alternatively also known as index guiding, optical waveguides and fiber optics are typically formed with an outer area and an inner area. The outer area is comprised of a material having a lower index of refraction than the material used for the inner area. This allows light to travel through the inner area with near total internal reflection at the interface between the inner and outer areas, allowing substantially all of the light to travel through the waveguide or fiber. With total internal reflection, the only substantial cause of loss is due to absorption and reflection in the material itself, rather than loosing light out of the material.

In optical fibers, it has been discovered that collinear tunnels can be inserted in the fiber. The number of tunnels and size of the tunnels that run through the optical fiber can affect the index of refraction of the material. By inserting more tunnel volume in an outer area of the fiber, and fewer tunnels in an inner area of the fiber, a holey optical fiber can be formed from a single medium having total internal reflection.

As previously discussed, the use of fiber optics for interconnects on circuit boards is limited due to manufacturing and tolerance constraints. Optical fibers can be relatively large compared to components on a circuit board, and they may not be able to be aligned within the tolerances needed to form a circuit board, and especially a multi-layer circuit board.

Forming an optical waveguide on a substrate using lithography or similar processes can provide the desired tolerances used in circuit card manufacturing. To reduce the amount of loss in an optical waveguide, voids can be formed throughout the waveguide. Adding a sufficient number of voids can substantially reduce the amount of loss caused by the waveguide material. For example, adding voids in the inner area may decrease the loss in the inner area from 10 dB per meter to 1 dB per meter or less. Additionally, the voids can alter the index of refraction of the material. This allows a waveguide to be formed of a single material, with an inner area having an inner total void volume to produce a first index of refraction and an outer area having an outer total void volume to produce a second index of refraction. The voids in the waveguide can be graded such that there is not a clear distinction between the inner and outer areas. The second index of refraction can be designed to be less than the first index of refraction to provide for total internal reflection in the waveguide.

For example, FIG. 1a shows an optical waveguide 100 having an outer area 102 and an inner area 104. The outer area can have a greater number of voids than the inner area to enable the outer area to maintain a lower index of refraction. The voids 108 in the inner and outer areas can have substantially any shape as long as one dimension is less than a wavelength of light. On average, a first dimension 110, as shown in the blowup area of FIG. 1a, can be substantially less than a wavelength of the light. A distribution of the voids can be ordered or relatively random.

The optical waveguide can be formed using lithographic or similar processes. For example, FIG. 1b shows a top view of an optical waveguide having an outer area 122 and an inner area 124. The waveguide can be formed in layers. Voids can be formed each layer. Alternatively, a plurality of the layers can include voids. In this example embodiment, the voids are shown distributed through the waveguide with a gradient of voids with the inner area having a lower density of voids and the outer area having a higher density of voids.

The voids can be formed using machining, etching, stamping, and similar type processes that can be used to form voids having at least one dimension less than a shortest wavelength of the light passing through the waveguide. The voids fabricated in this fashion, can be along the length of the waveguide or perpendicular to the waveguide as each layer of the waveguide is formed.

For example, FIG. 1c shows a layer of a waveguide 140 stamped with a plurality of voids 148. The voids shown are not to scale and are representative only. The voids may be stamped using nano-imprint lithography. In one embodiment, a first dimension of the voids can have an average size that is less than $1/10^{th}$ a wavelength of the light directed through the waveguide. In another embodiment, the first dimension can be less than $1/30^{th}$ the wavelength of the light. For example, a typical infrared wavelength of laser light that can be transmitted through a waveguide is around 1000 nanometers (nm). The average first dimension of the voids can be less than 30 nm.

The plurality of voids 148 can have a fairly random distribution and direction. Sufficient voids can be formed in the outer 142 and inner 144 areas to give each area a desired index of refraction. The index of refraction can be designed to maximize the efficiency of the waveguide for high bandwidth communications. For example, the material from which the waveguide is formed can have an index of refraction that is approximately 1.5. The index of air is approximately 1.0. In one embodiment, the outer area may have sufficient voids formed to provide an effective index of refraction of approximately 1.01. The inner area may have sufficient voids formed to provide an effective index of refraction of approximately 1.02 to 1.015. The number of voids in the inner and outer areas, and the distribution of the voids can be designed to provide a desired change in the index of refraction between the inner and outer areas.

The ability to design the optical waveguide to have a desired difference in refractive index between the inner and outer areas enables the waveguide to be useful in broadband applications such as dense wavelength division multiplexing. The effective index of refraction of the inner and outer areas can essentially be designed to be anywhere between approximately one and the index of refraction of the material from which the waveguide is formed.

FIG. 1d shows an exemplary embodiment of a waveguide 160 in which ordered vertical holes 162 and channels 164 (horizontal holes) are formed in the layers of the waveguide that are perpendicular to the direction of propagation of the waveguide. The holes and channels can, on average, have a first dimension that is substantially less than a wavelength of the light directed through the waveguide. The ordered holes may be used to provide horizontal control of the light as it travels through the waveguide material. The channels can provide vertical confinement of the light in the waveguide. The channels can have a low high low density distribution in the vertical direction.

For example, in one embodiment the holes 162 and/or channels 164 may be formed in a pattern that is used to control which modes of light travel through the waveguide. Photonic crystals also use ordered holes to control an index of refraction. This hybrid waveguide essentially have both index guiding using voids in the vertical direction and horizontal guiding using photonic crystal. In addition, the waveguide does not need to use photonic crystal ordering and can instead use a random distribution to form an effective index guiding, as previously discussed. The vertical channels can be any shape as long as one dimension is less than the wavelength of light. The density distribution of the vertical channels can be high low high to provide horizontal confinement of light.

The holes 162 and channels 164 can be substantially filled with a foam-like material having holes with a dimension that is less than a wavelength of the light. The foam-like material can be formed of polymers, dielectrics, or other material capable of forming holes that are less than a wavelength of the light. The holes and channels can be filled with foam or heat shrink polymer for subsequent layer processing or the layers can be laminated prior to other layers being added. This can enable additional layers to be added without filling the holes made in the previous layer.

An additional embodiment is shown in FIG. 1e. A top view of a layer of a waveguide 180 formed on a substrate is illustrated having an outer area 182 and an inner area 184. A plurality of voids 188 that are substantially collinear are shown. The voids can have an average first dimension that is substantially less than a wavelength of the light that is directed through the waveguide. The voids can have a second dimension that is less than a length 186 of the waveguide. Sufficient voids can be formed in the outer 182 and inner 184 areas to give each area a desired effective index of refraction.

Using lithographic or similar processes to form the waveguides enables a plurality of substantially similar waveguides to be formed. For example, FIG. 2a shows a front view of a one dimensional array 200 of waveguides. The array can include a desired number of waveguides, with each waveguide including an outer area 202 and an inner area 204. The outer area can have a greater number or volume of voids than the inner area to enable the outer area to maintain a lower index of refraction. The outer area can be shared between two inner areas. This allows a more dense array to be formed since the outer area between each inner area doesn't have to be twice as wide as a typical outer area in a single waveguide.

A single waveguide or an array 200 of waveguides can be constructed on a substrate 208. A plurality of voids can be formed in the substrate to enable the substrate to become part of the waveguide. For example, a sufficient number of voids can be formed in the substrate below each inner area 204 to provide a sufficient difference in the index of refraction of the inner area and the substrate that total internal reflection of the light in the inner area can occur.

Figure 2B:
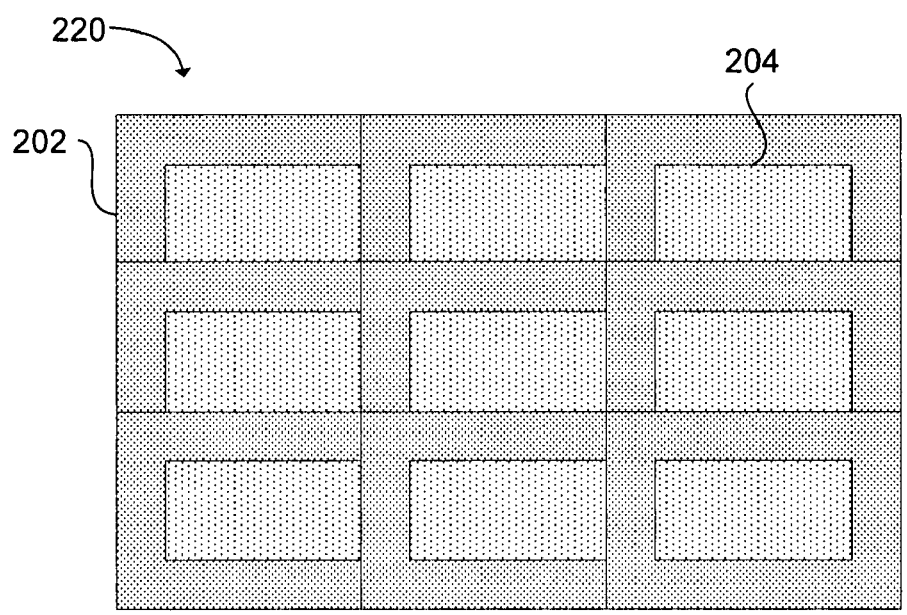
FIG. 2b is an illustration of a front view of a two dimensional array of optical waveguides, each having an inner area and sharing an outer area in accordance with an embodiment of the present invention.

A two dimensional array 220 of waveguides can be formed using lithographic or similar processes, as shown in FIG. 2b. As in the one dimensional array of FIG. 2a, the two dimensional array can be constructed of a plurality of inner areas 204, each surrounded by an outer area 202. The outer area can have a greater volume of voids than the inner area to enable the outer area to maintain a lower index of refraction such that total internal reflection of the light in the inner area can occur.

Figure 3:
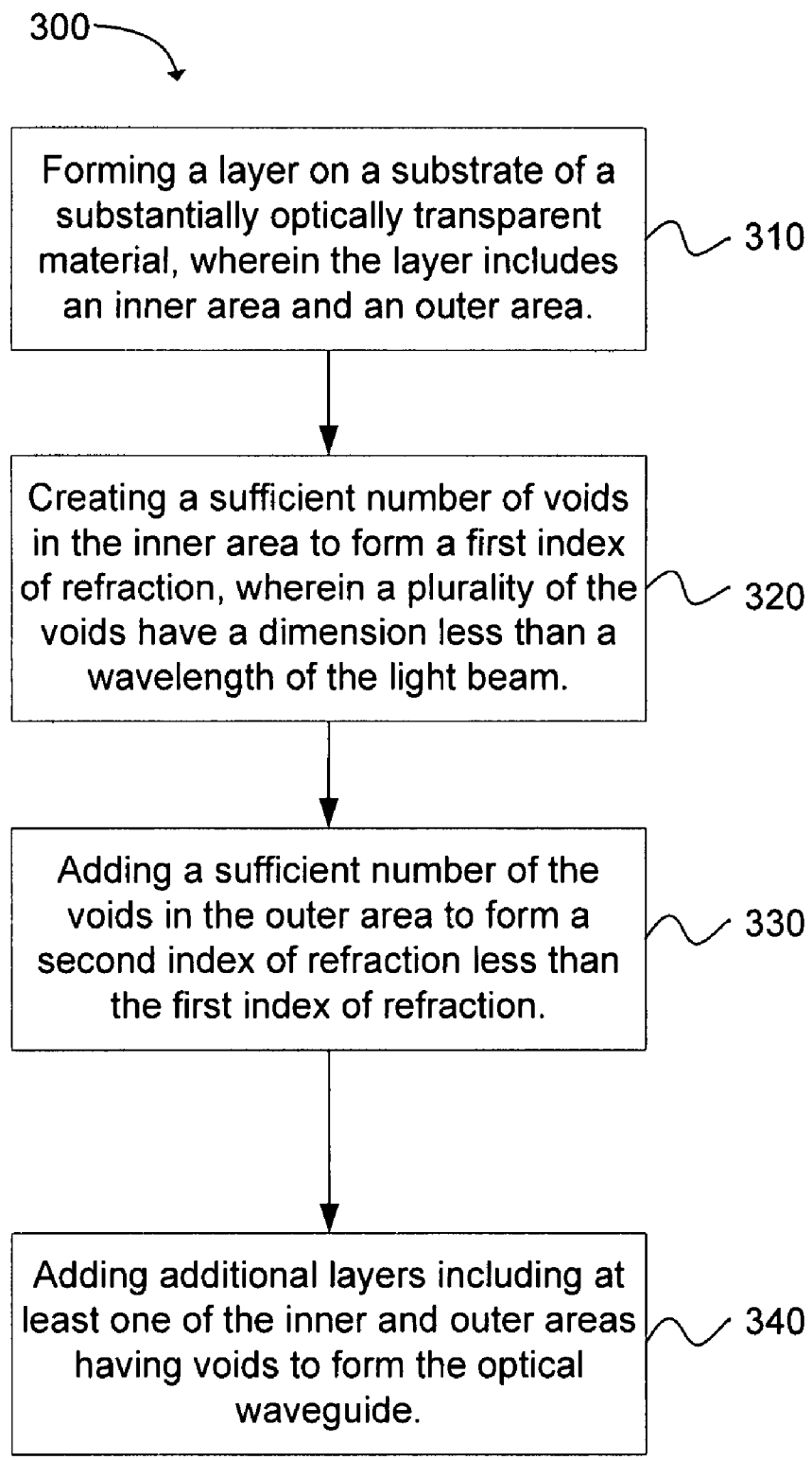
FIG. 3 is a flow chart depicting a method of making an optical waveguide for directing a light beam.

In another embodiment, a method 300 of making an optical waveguide for directing a light beam is disclosed, as shown in the flow chart of FIG. 3. The method includes the operation of forming 310 a layer on a substrate of a substantially optically transparent material. The layer includes an inner area and an outer area, as previously discussed.

An additional operation involves creating 320 a sufficient number of voids in the inner area to form a first index of refraction. A plurality of the voids have one dimension less than a wavelength of the light beam. The voids can be formed using etching, stamping such as nano-imprint lithography, micromachining, or other processes useful in forming voids in a medium. In one embodiment, the voids can be regularly spaced across the layer. In another embodiment, the spacing can be irregular. The voids also may be directional, such as collinear voids all directed in a similar direction. Alternatively, the direction of the voids can be fairly random. The voids, including the collinear voids, can have an overall length less than a length of the waveguide.

In another embodiment, holes can be formed in each layer that may be larger than the wavelength of the light transmitted through the waveguide. The holes and channels can be filled with a foam material having holes that are, on average, substantially less than a wavelength of the light. The foam can be formed of a polymer, a dielectric material, or some other type of material capable of forming a foam having holes less than a wavelength of the light.

As in the inner area, a sufficient number of the voids can be added 330 in the outer area to form a second index of refraction less than the first index of refraction. The voids in the outer area can be formed and have the same properties as previously described for the inner area. The total number or volume of the voids in the outer area can be sufficient that the second index of refraction can be less than the first index of refraction to allow waves from the light beam to propagate along the inner area with substantially total internal reflection.

The method 300 includes an additional operation of adding 340 additional layers including at least one of the inner and outer areas having voids to form the optical waveguide. Layers on the top and bottom of the waveguide may only include outer areas to encase the inner area, as shown in FIG. 1a.

The typical dimensions of an optical waveguide, including the inner and outer layers, can be around 10 wavelengths of the light that will travel through the waveguide. For example, the front face of the waveguide may be square. However, the size may vary depending on the design of the waveguide. The actual dimensions may be between one wavelength and hundreds of wavelengths.

An inner area in a typical waveguide may be between 1 and 3 wavelengths. The outer area may also be between 1 and 3 wavelengths. With holes that are as small as $1/30^{th}$ of the wavelength of the light, there can be between 30 and 90 layers for the inner area, and a similar number for the outer area. Obviously, a larger waveguide may include hundreds of layers. All of the layers in the waveguide will typically have holes or voids added. However, there may be some layers that do not have any holes. The length of the waveguide can be from less than a millimeter to over a meter in length. The waveguide can take any desired shape, such as round, square, rectangular, parallelogram, and the like.

Creating voids in an optical waveguide can provide many advantages over prior waveguides and optical fibers. It has been discovered that the refractive index of a material can be altered by forming voids in the material, where at least one dimension of the void is substantially smaller than a wavelength of the light transmitted through the material. Unlike the tunnels placed in holey fibers, there is no reason for the voids formed in an optical waveguide to be continuous or collinear with the waveguide. In fact, the voids can be relatively random in length and distribution so long as at least one dimension is substantially less than a wavelength of light traveling through the waveguide and the overall void distribution provides an outer area having a refractive index less than an inner area.

Optical waveguides having a plurality of voids can be formed in a cost effective manner using standard chip manufacturing techniques. The waveguides can be formed in arrays with physical tolerances sufficient to interconnect chips on multi-layer circuit boards. The plurality of voids can significantly reduce the loss in a waveguide. The lower loss waveguides having a plurality of holes can be useful in transmitting broadband data across a large circuit board. The index of refraction of the inner area and outer area of the waveguide can be designed by applying sufficient voids in each area to obtain a desired effective refractive index. The ability to create a preferred change in refractive index between the inner and outer area can enable the waveguide to be used to carry broadband data, such as dense wave division multiplexing with minimal affects to the optical data streams.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An optical waveguide, comprising:
   an optical waveguide formed on a substrate and configured to direct a light beam, wherein the waveguide has an inner area with a first index of refraction and an outer area with a second index of refraction, and wherein the optical waveguide has a loss of less than 1 dB per meter;
   the inner area having a sufficient number of voids with a first dimension less than a wavelength of the light beam to enable the first index of refraction to be set at a predetermined level; and
   the outer area including a sufficient number of voids having a first dimension less than the wavelength of the light beam to enable the second index of refraction to be set at a level less than the first index of refraction wherein the first dimension of a plurality of the voids is less than $1/10^{th}$ of a shortest wavelength of the light beam.

2. A device as in claim 1, wherein the voids are tunnels running collinear with a direction of the optical waveguide.

3. A device as in claim 2, wherein the voids have a second dimension substantially less than a length of the optical waveguide.

4. A device as in claim 1, wherein the voids have a second dimension directed in a substantially random direction.

5. A device as in claim 1, wherein the voids are filled with a foam material having a plurality of holes with a first dimension less than a shortest wavelength of the light beam.

6. A device as in claim 5, wherein the foam material is selected from the group consisting of polymer material and dielectric material.

7. A device as in claim 1, wherein the optical waveguide has a loss of less than 0.1 dB per meter.

8. A device as in claim 1, wherein the first dimension of the plurality of the voids is less than $1/30^{th}$ of the shortest wavelength of the light beam.

9. A device as in claim 1, wherein the optical waveguide formed on the substrate is comprised of a plurality of layers 10. A method of making an optical waveguide for directing a light beam, comprising:
    forming a layer on a substrate of a substantially optically transparent material, wherein the layer includes an inner area and an outer area;
    creating a sufficient number of voids in the inner area to form a first index of refraction, wherein a plurality of the voids have a dimension less than a wavelength of the light beam;
    adding a sufficient number of the voids in the outer area to form a second index of refraction less than the first index of refraction, wherein a plurality of the voids have a dimension less than a wavelength of the light beam; and
    adding additional layers including at least one of the inner and outer areas to form the optical waveguide;
    wherein the dimension of a plurality of the voids is less than $1/10^{th}$ of a shortest wavelength of the light beam
    wherein the optical waveguide made by the method has a loss of less than 1 dB per meter.

11. A method of making as in claim 10, further comprising adding voids to a plurality of the additional layers to form the first and second index of refractions in the inner and outer areas respectively.

12. A method of making as in claim 10, further comprising creating a sufficient number of voids in the substrate on which the optical waveguide is formed to enable the substrate to have a selected index of refraction.

13. A method of making as in claim 10, further comprising forming the voids in at least one of the inner and outer areas such that the voids are comprised of collinear columns.

14. A method of making as in claim 10, further comprising forming the voids in at least one of the inner and outer areas such that the voids are comprised of collinear channels.

15. A method of making as in claim 14, further comprising forming the voids in at least one of the inner and outer areas such that the voids are comprised of holes substantially orthogonal to the collinear channels.

16. A method of making as in claim 14, further comprising forming the voids in at least one of the inner and outer areas such that the voids have substantially randomly distributed.

17. A method of making as in claim 10, further comprising forming the voids in at least one of the inner and outer areas such that the voids have a plurality of shapes, with each shape having a dimension less than the wavelength of the light.

18. A method of making as in claim 10, further comprising forming the sufficient number of voids in the inner area to have an inner void volume sufficient to set the first index of refraction to a predetermined level.

19. A method of making as in claim 10, further comprising forming the sufficient number of voids in the outer area to have an outer void volume sufficient to set the second index of refraction at a predetermined level that is less than the first index of refraction.

20. A method of making as in claim 10, wherein a distribution of the voids in the optical waveguide is based on a gradient, with a higher number of voids in the outer area.

21. A method of making as in claim 10, further comprising covering the voids in at least one of the inner and outer areas with at least one of a heat shrink polymer and a laminate to enable additional layers to be added without filling the voids.

22. A photonic guiding device, comprising:
    an optical waveguide constructed on a substrate and configured to direct a light beam, wherein the waveguide has an inner area with a first index of refraction and an outer area with a second index of refraction, and wherein the optical waveguide has a loss of less than 1 dB per meter;
    wherein the inner area has a sufficient number of voids to enable the first index of refraction to be set at a predetermined level, wherein the voids have an average diameter less than a wavelength of the light beam; and
    wherein the outer area includes a sufficient number of voids having an average diameter less than the wavelength of the light beam to enable the second index of refraction to be set at a level less than the first index of refraction
    wherein the average diameter of a plurality of the voids is less than $1/10^{th}$ of a shortest wavelength of the light beam.

* * * * *

UNITED STATES PATENT AND TRADEMARK OFFICE
CERTIFICATE OF CORRECTION

PATENT NO.       : 7,835,610 B2          Page 1 of 1
APPLICATION NO.  : 11/786519
DATED            : November 16, 2010
INVENTOR(S)      : Wei Wu et al.

It is certified that error appears in the above-identified patent and that said Letters Patent is hereby corrected as shown below:

In column 7, line 24, in Claim 1, delete "than1 dB" and insert -- than 1 dB --, therefor.

In column 7, line 54, in Claim 9, delete "layers" and insert -- layers. --, therefor.

Signed and Sealed this
Twenty-sixth Day of April, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,835,610 B2 | Page 1 of 1 |
| APPLICATION NO. | : 11/786519 | |
| DATED | : November 16, 2010 | |
| INVENTOR(S) | : Wei Wu et al. | |

It is certified that error appears in the above-identified patent and that said Letters Patent is hereby corrected as shown below:

In column 7, lines 29-34, in Claim 1, delete "the outer area including a sufficient number of voids having a first dimension less than the wavelength of the light beam to enable the second index of refraction to be set at a level less than the first index of refraction wherein the first dimension of a plurality of the voids is less than $1/10^{th}$ of a shortest wavelength of the light beam." and
insert -- the outer area including a sufficient number of voids having a first dimension less than the wavelength of the light beam to enable the second index of refraction to be set at a level less than the first index of refraction,
wherein the first dimension of a plurality of the voids is less than $1/10^{th}$ of a shortest wavelength of the light beam. --, therefor.

Signed and Sealed this
Twenty-eighth Day of June, 2011

David J. Kappos
*Director of the United States Patent and Trademark Office*